Feb. 24, 1942.                R. W. JOHNSON                    2,274,145
                   TEMPERATURE COMPENSATING METERING VALVE
                           Filed July 22, 1940
Fig. 1.
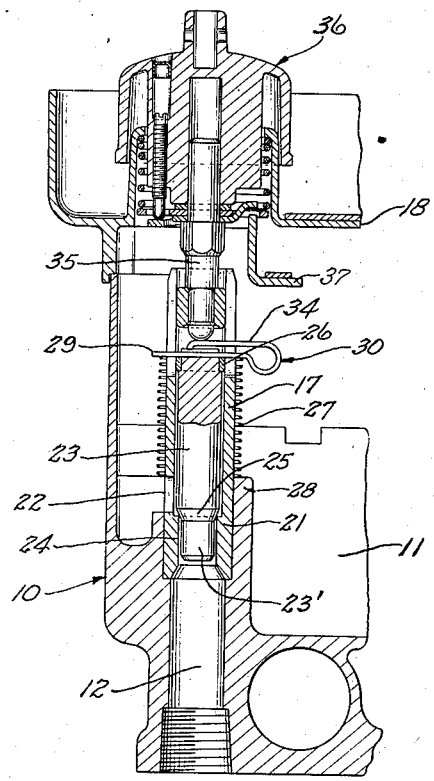
Fig. 2.
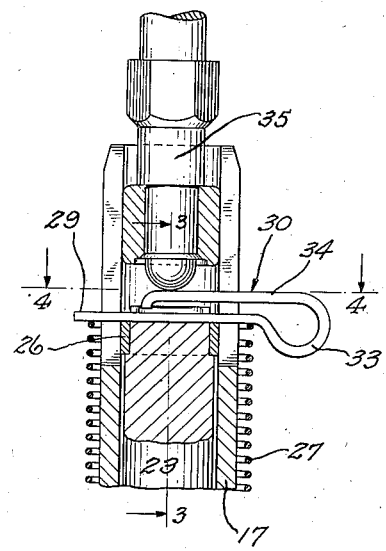
Fig. 3.
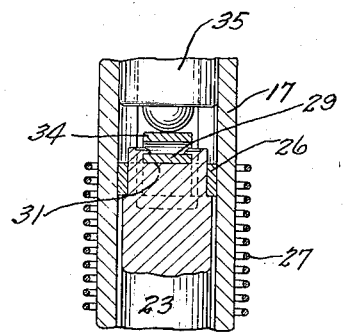
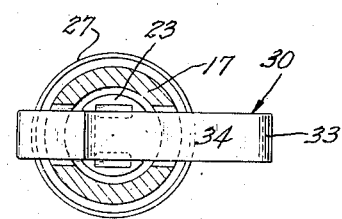
Fig. 4.
INVENTOR
ROY W. JOHNSON
BY John W. Michael
ATTORNEY Patented Feb. 24, 1942

2,274,145

UNITED STATES PATENT OFFICE 2,274,145

TEMPERATURE COMPENSATING METERING VALVE

Roy W. Johnson, Milwaukee, Wis.

Application July 22, 1940, Serial No. 346,751

5 Claims. (Cl. 137—21)

This invention relates to an improvement in oil control devices of the type interposed between a reservoir and a burner wherein the fuel flows by gravity to the burner, and this invention is concerned more particularly with the metering valve mechanism employed in such devices for metering or regulating the flow from the liquid supply chamber of the device to the burner.

Oil control devices of this character as commonly used have a liquid supply chamber in which a predetermined level of liquid is maintained by means of a float controlled inlet valve. The outlet of this liquid supply chamber is connected to the burner and flow through the outlet is regulated by means of a metering valve. Metering valves are ordinarily adjustable so as to provide for a high fire, and a pilot or low fire, and in some instances for an intermediate fire. The control thus exercised over the metering valve may be by means of a manually operable control knob which acts through cam or other similar means to move the metering valve toward and away from its seat. In some instances also thermostatic means are employed to control the position of the metering valve.

While devices of this character have proven quite satisfactory in use, they have been deficient in one particular and that is, no effective and practical means has heretofore been devised for compensating for the variations in the flow of the oil which are consequent upon changes in the viscosity of the oil due to temperature changes.

An object of the present invention is to provide an oil control device of the character mentioned which embodies a metering valve for regulating flow of the oil from the outlet of the liquid supply chamber to the burner and which interposes between the metering valve and its operator a temperature compensating mechanism which automatically varies the action of the device to compensate for changes in the viscosity of the oil due to changes in temperature.

In carrying out the present invention, the metering valve is commonly biased to open position by a spring or the like and is adjusted toward its seat either under the control of a manually operable cam mechanism or under the control of a thermo responsive lever action. In either type of structure, the present invention proposes to interpose a bimetallic motion transmission element between the valve operator and the valve, the position of the bimetallic motion transmission element changing in response to changes in the temperature so as to compensate for changes in oil viscosity which follow upon temperature changes. Preferably the bimetallic element is in the form of a U-shaped strip having one leg fixed to the valve and the other leg thereof engaged with the valve operator.

Other objects and advantages reside in certain novel features of the construction, arrangement, and combination of parts, which will be hereinafter more fully described and particularly pointed out in the appended claims, reference being had to the accompanying drawing forming a part of this specification, and in which:

Figure 1 is a fragmentary view, partly in longitudinal vertical cross-section and partly in side elevation, showing an oil control device embodying the present invention.

Figure 2 is a fragmentary view on an enlarged scale, illustrating especially the manner in which the bimetallic element is combined with the metering valve and its operator.

Figure 3 is a fragmentary view in vertical cross-section taken on line 3—3 of Figure 2, and Figure 4 is a view in horizontal cross-section taken on line 4—4 of Figure 2.

Referring to the drawing, it will be seen that the control device comprises a casing designated generally at 10 and having a main liquid supply chamber 11 therein. A predetermined level of liquid fuel is maintained in this supply chamber 11 by mechanism not shown in the drawing but which is preferably of the type fully described and claimed in my Patent No. 2,068,138 granted January 19, 1937.

The liquid flows out of the main supply chamber 11 through one or more outlet passages 12 which are connected up to the burner (not shown).

A tubular valve guide 17 which may be constituted of a brass tube has its lower end press fitted in or otherwise suitably secured to the upper portion of the outlet passage 16, the valve guide expanding vertically in the casing and terminating a short distance below the top or cover plate 18 thereof. A valve seat 21 is machined in and constituted as an integral part of the tube 17. Above the valve seat 21 the tube 17 is provided with a lateral opening 22 to provide for communication between the interior of the guide tube and the liquid supply chamber 11.

A metering valve designated generally at 23 is loosely fitted in the guide tube and has a reduced lower end 23¹ provided with the usual metering slot (not shown). The reduced lower end portion 23¹ of the metering valve is a sliding or guiding fit in the correspondingly formed portion 24 of the tube 17, the portion 24 having a reduced internal diameter and functioning as a guide for the lower end of the valve. Just above the reduced portion 23¹ the metering valve is formed with a beveled portion 25 which coacts with the valve seat 21 to shut off the flow of the fuel in the fully closed or shut off position of the valve. The upper end portion of the metering valve is provided with a guide ferrule or sleeve 26 so that the valve is constrained to straight line sliding movement in the valve tube.

The metering valve is biased to open position by means of an expansible coil spring 27 which surrounds the valve tube 17 and has its lower end abutting a shoulder 28 provided on the casing 10. The upper end of the spring 27 may be interconnected with the valve 23 in any suitable way. In the construction illustrated the spring abuts the lower leg 29 of the approximately U-shaped bimetallic element 30 combined with the upper end of the valve.

The bimetallic element 30 is horizontally disposed and has a portion of its lower leg 29 fitted in and staked to a slot 31 formed in the upper end of the metering valve. The body portion 33 of the bimetallic element is looped or rounded, and the upper leg 34 thereof overlies the lower leg in spaced though adjacent relation thereto.

The operator or adjusting mechanism for the valve coacts with the upper leg of the bimetallic element. As illustrated in Figures 1 and 2 this operating mechanism may take the form of a plunger 35 controlled as to position by means of manually operable cam mechanism 36 or by means of a thermostatically actuated lever 37.

The details of the valve operator per se form no part of the present invention. If of the manually adjustable type, it may take the form described and claimed in my application for Interchangeable metering valve control, filed June 23, 1938, Serial No. 215,336. If of the thermally controlled type, it may be constructed as described and claimed in my application for Conversion oil control, filed April 4, 1940, Serial No. 327,789.

In the embodiment of the invention illustrated in the drawing, diametrically opposite portions of the upper end of the tubular valve guide 17 are provided with slots 17¹ in which portions of the bimetallic element 30 are a free-sliding fit.

With this construction, changes in the temperature cause the upper free leg 34 of the bimetallic element to move relative to the leg 39 thereof fixed to the metering valve thereby varying the action of the valve in such a manner as to compensate for changes in oil viscosity incident to temperature changes.

The temperature of the oil supplied to the control device varies depending upon the temperature to which it is subjected in its storage tank and in the supply line leading from the storage tank to the control device and also varies under the influence of the ambient temperature of the control device.

The bimetallic element 30 in the device shown in the drawing is positioned above the oil level in the chamber 11 and therefore is responsive to the ambient temperature within the liquid supply chamber 11 and also to some extent to the temperature of the oil supplied to said chamber since the temperature of the oil has some influence on the ambient temperature and also affects the action of the bimetallic element through conduction. If the device is and it may be designed to have the bimetallic element immersed in the oil in the liquid supply chamber 11, then, of course, the element 30 is responsive directly to changes in the oil temperature.

While I have shown and described one construction in which the invention may be advantageously embodied, it is to be understood that the construction shown has been selected merely for the purpose of illustration or example and that various changes in the size, shape, and arrangement of the parts may be made without departing from the spirit of the invention or the scope of the subjoined claims.

I claim:

1. A control device of the character described comprising a casing having a liquid supply chamber provided with an outlet, a metering valve for regulating flow through said outlet, an operator for said valve, a common guide for said valve and said operator, and motion transmission means between said operator and said valve guided by said common guide and comprising a bimetallic element responsive to temperature changes and automatically varying the position of the valve to compensate for changes in oil viscosity due to variations in temperature.

2. A control device of the character described comprising a casing having a liquid supply chamber provided with an outlet, a metering valve for regulating flow through said outlet, means for biasing said valve to open position, an approximately U-shaped bimetallic element having one leg fixed to the top of said valve and its other leg overlying and closely adjacent though spaced from said first mentioned leg, and a valve operator axially alined with said valve and engaged with said last mentioned leg, said operator being movable to close said valve against the force of said biasing means.

3. A control device of the character described comprising a casing having a liquid supply chamber provided with an outlet, a metering valve for regulating flow through said outlet, means for biasing said valve to open position, a horizontally disposed U-shaped bimetallic element having its lower leg secured to the upper end of the valve, and an operator for the valve coacting with the upper leg of said U-shaped bimetallic element, said operator being movable to close said valve against force of said biasing means.

4. An oil control device of the character described comprising a casing having a liquid supply chamber provided with an outlet passage, a tubular valve guide having its lower end connected with the outlet passage, said valve guide having an internal valve seat adjacent its lower end and being provided with a lateral opening above said valve seat to provide for communication between the liquid supply chamber and the interior of the guide, a metering valve cooperable with the valve seat, the upper portion of the tubular guide having diametrically opposite slots, a U-shaped bimetallic strip freely slidable in said slots and having its lower leg connected to the upper end of the metering valve, and a valve operator coacting with the upper leg of the U-shaped bimetallic strip.

5. An oil control device of the character described comprising a casing having a liquid supply chamber provided with an outlet passage, a tubular valve guide having its lower end connected with the outlet passage, said valve guide having an internal valve seat adjacent its lower end and being provided with a lateral opening above said valve seat to provide for communication between the liquid supply chamber and the interior of the guide, a metering valve cooperable with the valve seat, the upper portion of the tubular guide having diametrically opposite slots, a U-shaped bimetallic strip freely slidable in said slots and having its lower leg connected to the upper end of the metering valve, and a valve operator coacting with the upper leg of the U-shaped bimetallic strip, in combination with a spring for biasing the metering valve to open position, said spring encircling the tubular valve guide, having its lower end abutting the casing and having its upper end engaged with portions of the lower leg of said bimetallic strip.

ROY W. JOHNSON.